Dec. 10, 1929.  A. KINGSBURY  1,739,362
BEARING
Filed Oct. 13, 1927    4 Sheets-Sheet 1

Inventor
Albert Kingsbury
By Cameron, Kerkam & Sutton
Attorneys

Dec. 10, 1929.    A. KINGSBURY    1,739,362
BEARING
Filed Oct. 13, 1927    4 Sheets-Sheet 3

Inventor
Albert Kingsbury
By Cameron, Kerkam & Sutton
Attorneys

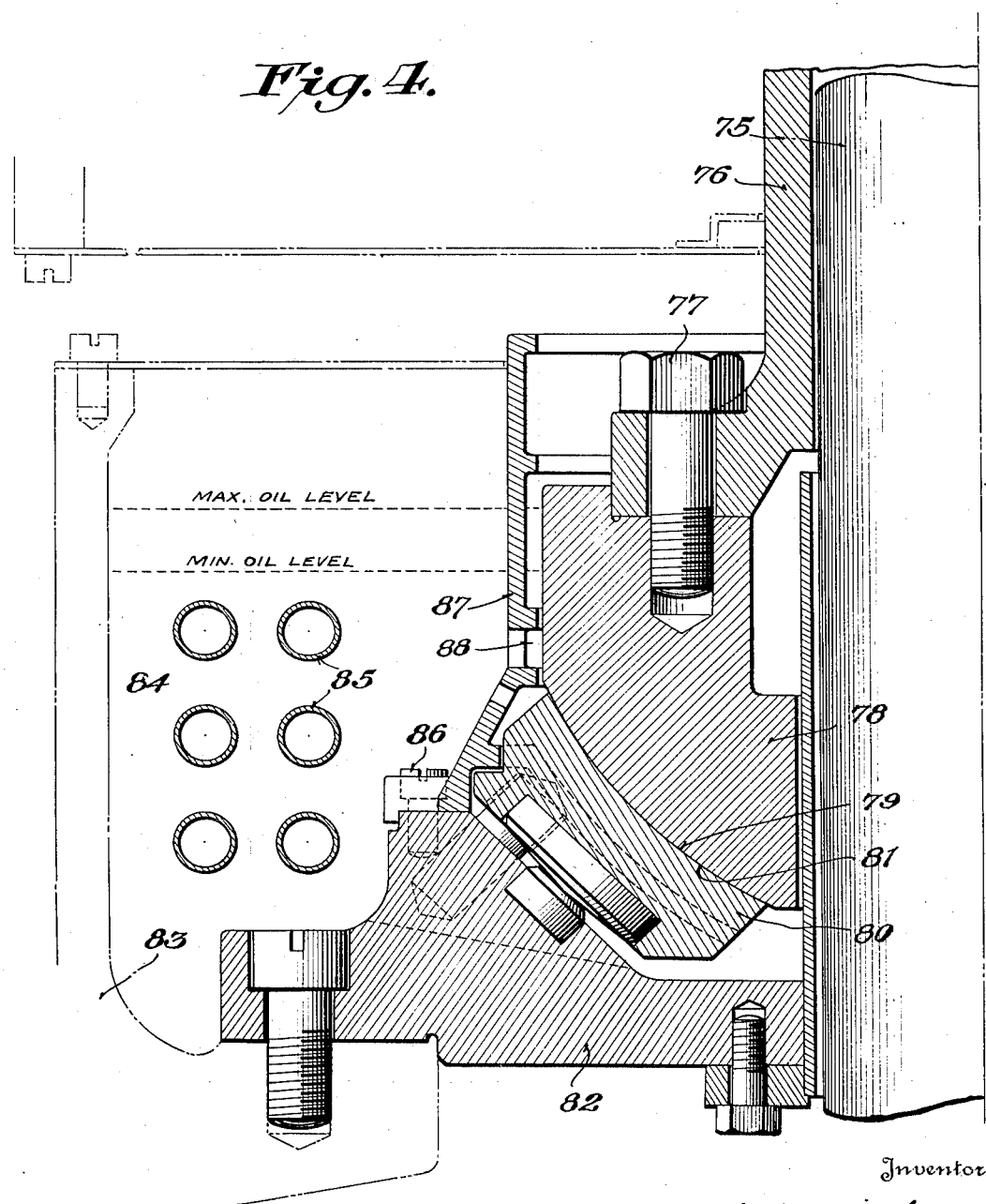

Patented Dec. 10, 1929

1,739,362

UNITED STATES PATENT OFFICE

ALBERT KINGSBURY, OF GREENWICH, CONNECTICUT, ASSIGNOR TO KINGSBURY MACHINE WORKS, INC., OF PHILADELPHIA, PENNSYLVANIA, A CORPORATION OF DELAWARE

BEARING

Application filed October 13, 1927. Serial No. 226,001.

This invention relates to thrust bearings, especially thrust bearings for hydroelectric units, motor-driven pumps, and analogous machines, and more particularly to the construction of the thrust bearing and the arrangement of said bearing with respect to the driving and driven elements of the machine with which it is associated.

An object of this invention is to provide a hydroelectric unit with a novel thrust bearing which will centralize the shaft closely and accurately without requiring the presence of an adjacent steady bearing.

Another object of this invention is to provide a hydroelectric unit with a novel thrust bearing which will so closely centralize the water wheel that its running clearance may be reduced, and the water leakage correspondingly diminished, and thereby the overall efficiency of the unit increased.

Another object of this invention is to provide a novel thrust bearing which may be so constructed with regard to the lateral forces tending to move the shaft out of central position that it will act to maintain the desired centralization of the shaft at the desired point in the length of the shaft.

Another object of this invention is to provide a novel thrust bearing which will act as a guide or steady bearing and closely and accurately centralize the shaft, and thereby reduce the running clearances below the clearances ordinarily obtained by the use of guide or steady bearings of the journal type.

In vertical motor-driven pumps it is common to employ, in addition to its two steady bearings, a thrust bearing to carry the weight of the rotor of the motor, a flexible coupling below the motor for coupling the pump shaft to the motor shaft, and a steady bearing and a thrust bearing below said coupling for guiding the upper end of the pump shaft and for supporting the weight of the rotary elements of the pump. It is an object of this invention to provide such a construction and arrangement that one of these thrust bearings may be dispensed with, and whereby a thrust bearing between the motor and the pump may take the place of the steady bearing and the thrust bearing heretofore used at this place.

Another object of this invention is to provide a vertical motor-driven pump with a thrust bearing as just referred to which, by reason of its location between the motor and the pump, may be water-cooled without danger of injury to the motor because of leakage from the water-cooling system.

Another object of this invention is to provide a novel thrust bearing of the spherical type with improved means whereby the thrust block and runner may be maintained accurately centered with the shaft at all times.

Other objects of this invention relate to the provision of a thrust bearing of the spherical type having improved means for maintaining an oil circulation; for preventing leakage of the oil along the shaft; for reducing the power losses during operation; for providing for the adjustment of the bearing; and for centralizing the shaft in the event the shaft is not seated on the thrust bearing.

Other objects will appear as the description of the invention proceeds.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

Referring in detail to the drawings, wherein the same reference characters are employed to designate corresponding parts in the several figures:—

Fig. 4 is a half axial section, somewhat diagrammatic, illustrating another form which the thrust bearing may take.

Figure 1:
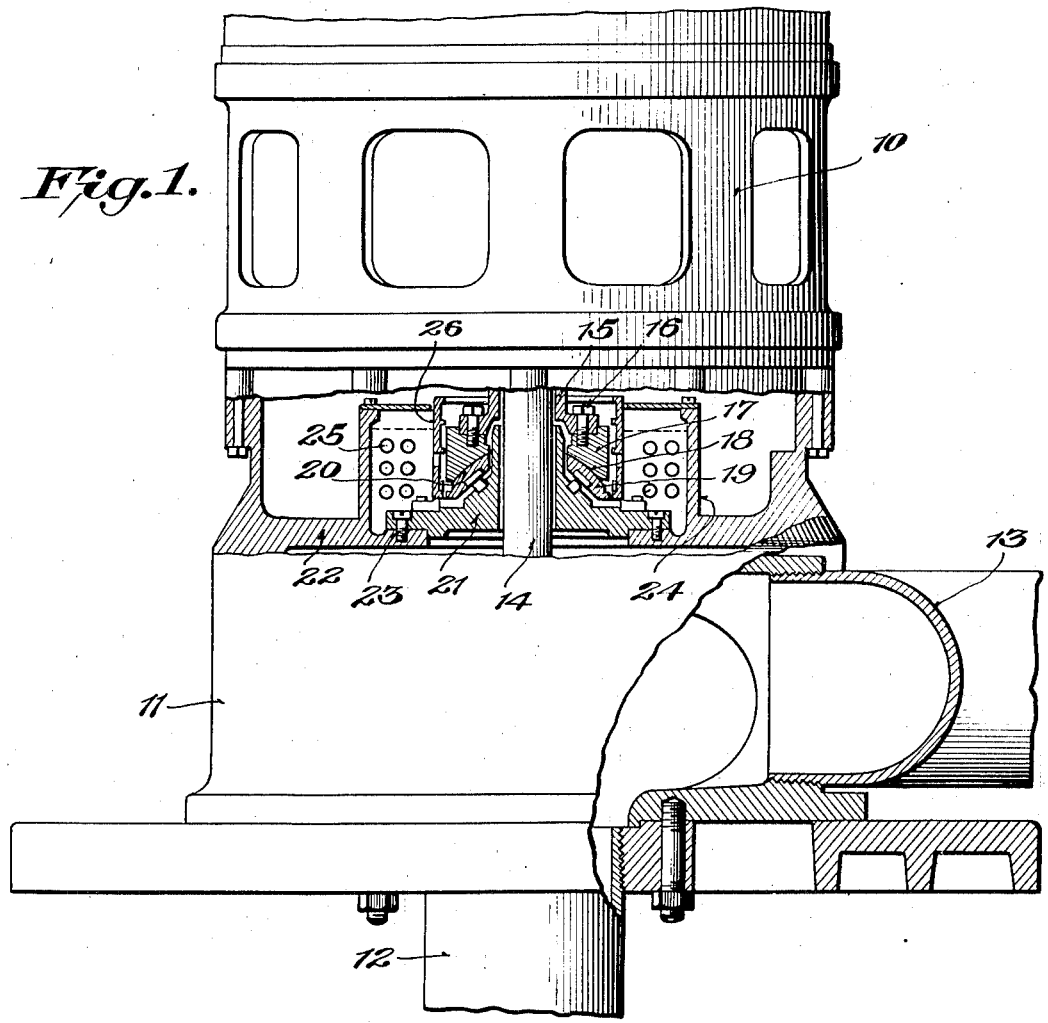
Fig. 1 is a schematic elevation, partly broken away, to show an embodiment of the present invention and one form which the thrust bearing thereof may take.

Referring to the diagrammatic illustration of Fig. 1, 10 designates any suitable generator or motor and 11 designates the housing of any suitable water wheel, which term will be used as generic to the water wheels of turbines and the impellers of pumps, the term "hydroelectric unit" being also employed as generic to turbine-driven generators and motor-driven pumps. Inlet and outlet connections are shown at 12 and 13. The shaft 14 of the water wheel is shown as extending vertically within a tubular shaft or quill 15, which carries the rotor of the generator or motor 10 and is connected to the shaft 14 in any suitable way, as by an adjusting nut above the rotor. The quill 15 has attached thereto in any suitable way, as by bolts 16, a runner or thrust collar 17, the bearing surface 18 of which is shown as spherically concave. Cooperating with said bearing surface 18 is a stationary bearing member 19 having its bearing surface 20 spherically convex to conform with and cooperate with the concave bearing surface 18. This stationary bearing member may be of any suitable construction, as a rigid collar provided with transverse oil grooves, or a series of connected bearing shoes, etc., but I prefer to employ a plurality of structurally independent bearing shoes which are tiltably mounted, in any suitable way, on a base ring 21 of any suitable construction and in turn carried by the deck 22 to which it is suitably attached, as by bolts 23. Said base ring 21 or the deck 22 has formed thereon, or suitably attached thereto, an axially extending wall 24 which forms the outer wall of an oil well for the bearing parts, and in which oil well a cooling coil 25 is diagrammatically indicated. A cylindrical baffle 26 may be disposed around the bearing members, closely adjacent thereto, and means may be provided in association therewith for cooperation with the thrust collar 17 to constitute a viscosity pump—all as will be explained more in detail in connection with the embodiment of Figs. 2 and 3.

Figure 2:
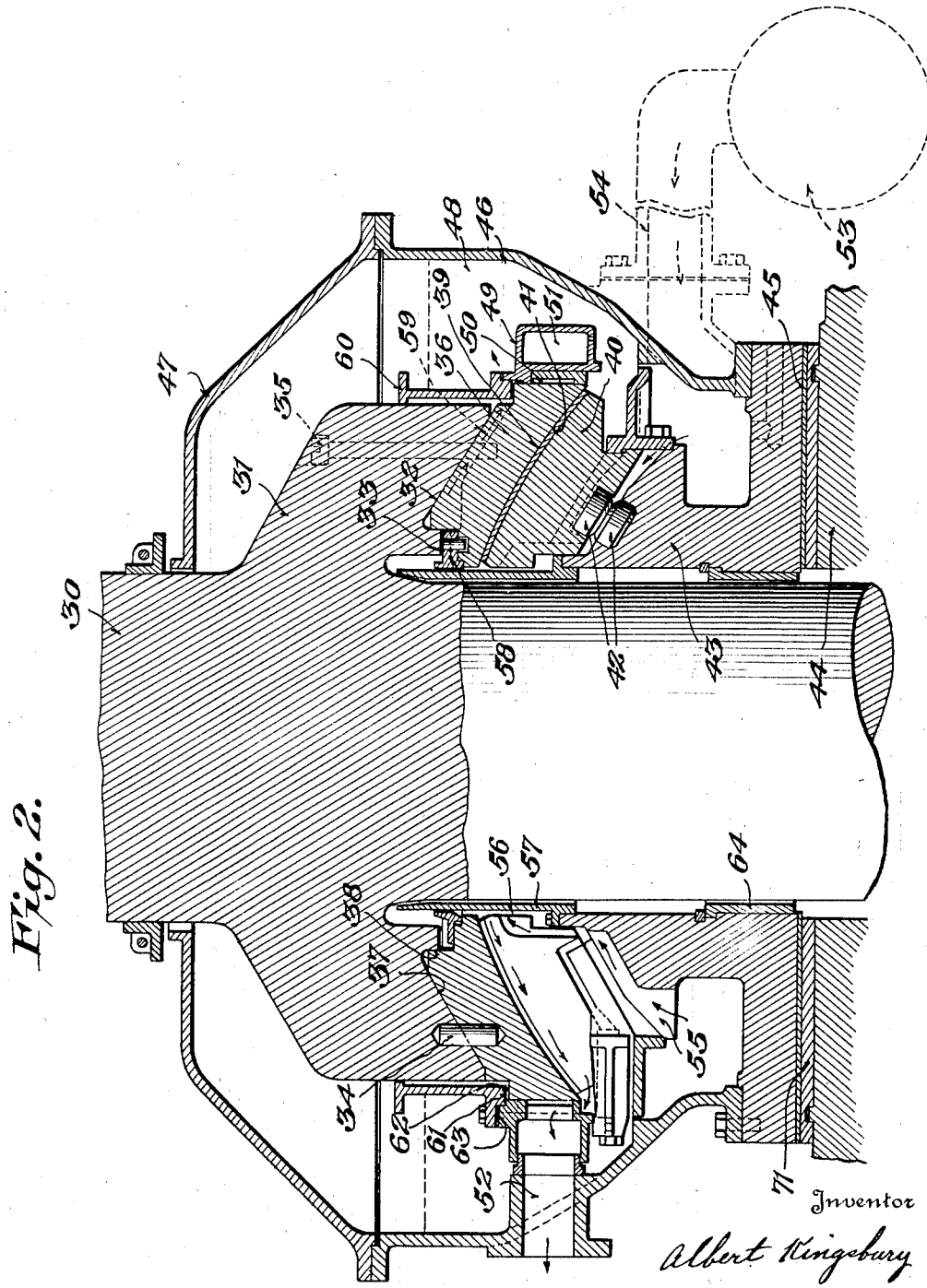
Fig. 2 is an axial section of another and preferred construction of thrust bearing embodying the present invention.
Figure 3:
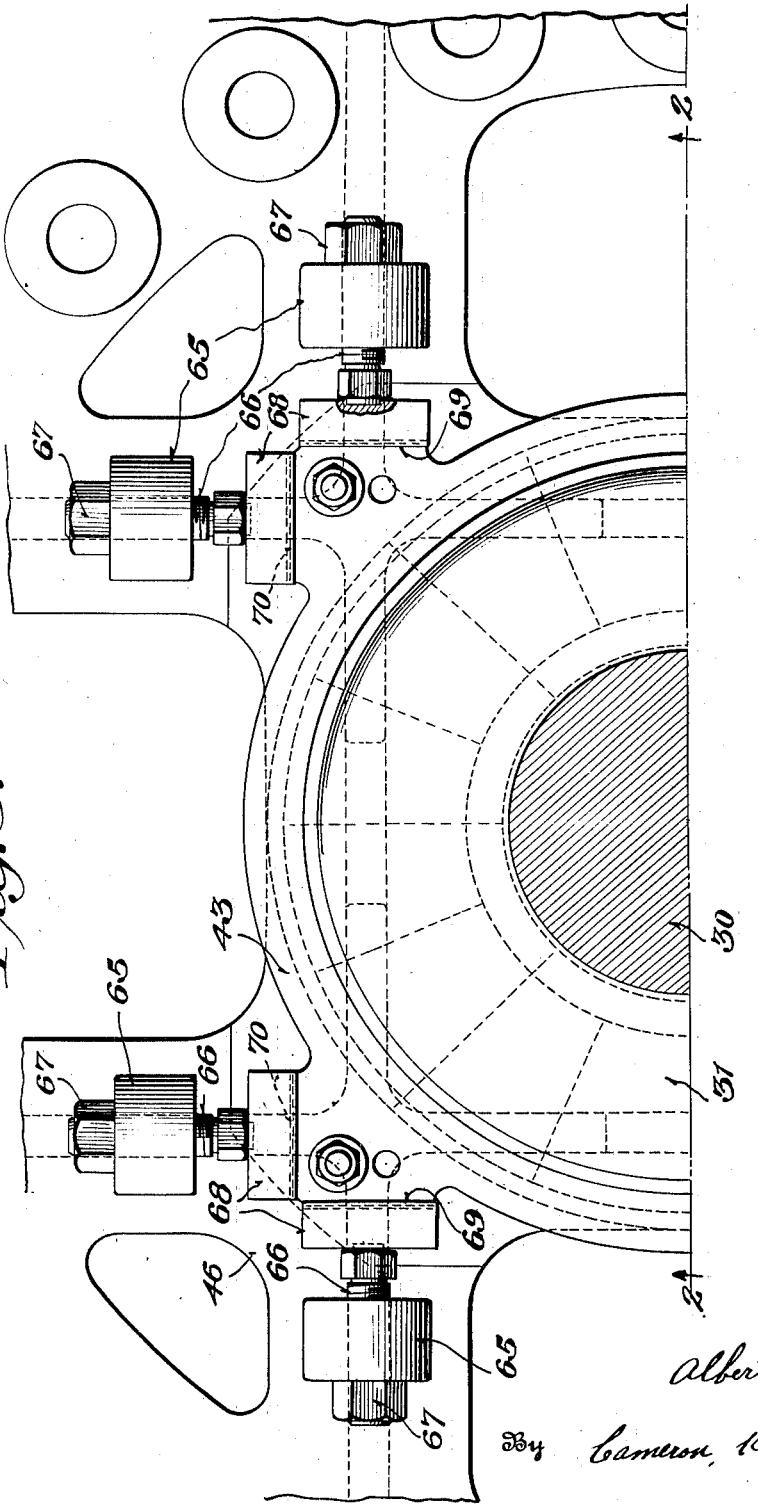
Fig. 3 is a half plan of the construction shown in Fig. 2.

Referring to the embodiment of Figs. 2 and 3, a preferred construction of spherical thrust bearing is illustrated, this embodiment also illustrating a number of improvements applicable to spherical bearings used in other relations than herein described. In the form shown, the shaft 30 is shown as a solid shaft having a thrust block 31 formed integrally therewith, but it is to be expressly understood that a separate thrust block suitably attached to the shaft may be used, or that a tubular shaft or quill may be employed in place of the solid shaft illustrated, as in Fig. 1, if desired. The under face of the thrust block 31 is formed as a conical surface 32, the angle of conicity being preferably so selected that the generatrix is parallel to the mean inclination of the bearing surfaces to the horizontal, i. e., parallel to the tangent to the bearing surafces at the mean radius. It is preferred to have the thrust block integral with the shaft because a thrust block so constructed and having the proper conicity of its under surface is not affected by temperature variations to throw the spherical bearing parts out of true, whereas if the thrust block should became loose on the shaft by reason of expansion, part of the value of the spherical bearing would be lost.

The under, face of the thrust block is also preferably provided with a depending rib 33 for centering the thrust collar, and mounted on said thrust block in any suitable way, as by dowel pins 34 and bolts 35, is a thrust collar 36 having a conical surface 37 which mates with and engages the conical surface 32. At its inner periphery collar 36 has a turned fit at 38 with the radially outer surface of the rib 33, whereby it is accurately centered, said fit, however, being easy so that the collar may be readily assembled and disassembled with respect to the thrust block. This construction enables the collar to expand relatively to the thrust block without in any manner affecting the centralization of the shaft, and thereby is avoided any looseness and lack of centralization which might arise if the thrust collar were merely fitted to the shaft, as in usual practice.

If desired, spherical surfaces may be employed in place of the conical surfaces 32 and 37, but for general purposes the conical fit is easier to produce and is amply accurate for the purpose.

The bearing surface 39 of the thrust collar 36 is made spherically concave as in the embodiment heretofore described, and cooperating therewith are a suitable number of shoes 40 provided with convex spherically-shaped bearing surfaces 41, mating and cooperating with the bearing surface 39 of said collar, although as heretofore pointed out the stationary bearing member may, if desired, be a rigid member with transverse oil grooves or a plurality of connected shoes, etc. Said bearing shoes 40, when employed, may be tiltably mounted in any suitable way, as by the use of jackscrews, or by the use of spherically-faced projections 42 on, or formed on inserts in, the backs of the shoes or the face of a base ring 43, or both. The use of fixed projections 42 eliminates the danger of displacement of the shaft laterally, which might otherwise arise, unless skill were used, by adjustment of jackscrews. The shoe members, taken with their supports, should be individually incompressible with respect to the base ring, or at least composed of three or more sets of members which are independently incompressible, although the members of each set may be flexible or interequalized, because the spherical bearing would not maintain the desired centralization of the shaft if the shoe members with their supports were all compressible or completely interconnected.

The base-ring 43 may be of any suitable construction and it is mounted in any suitable way upon a deck or spider 44, preferably with the interposition of electrical insulation 45. Mounted on the base-ring 43 or on the deck 44 is a housing 46 of any suitable shape and construction, shown as provided with a cover 47. In the form shown, said housing 46 provides the outer wall of an oil well 48 in which the bearing members are immersed and in which is a horizontal partition dividing the reservoir into upper and lower chambers.

Surrounding the periphery of the thrust collar 39 is a viscosity pump ring 49 of known construction, whereby the oil is drawn into the radially narrow channels 50 between the periphery of said collar and the interior wall of said ring, and forced therefrom through suitable outlets into the pressure chamber 51 of said ring. Said pump draws oil from the upper chamber of the reservoir where the oil is exposed to the air to allow for expansion, and the oil from the bearing surfaces is discharged into this chamber. Said pressure chamber 51 communicates with a suitable discharge conduit 52 which leads to an oil cooler 53 of any suitable size and construction and preferably disposed entirely below the oil level in the oil well 48, so that the system is full of oil at all times. From the cooler 53 the oil is returned under pressure to the lower chamber of the oil well 46 through inlet conduits 54.

The oil returning from the cooler to the lower chamber of the oil well, being under pressure, is forced to flow radially inward through the passages 55 below the shoes 40, whence it flows axially upward to the thrust bearing surfaces through the space 56 between the inner periphery of said shoes and the oil retaining ring 57 suitably carried by the base-ring 43. Thence the oil flows outward between the shoes as indicated by the arrows in Fig. 2. The circulating oil is maintained under considerable pressure by means of restricted outlets from the passages between the shoes. A loose seal ring 58 is therefore preferably mounted in any suitable way on the inner periphery of the thrust collar 39 so as to cooperate with the wall of the oil retaining ring 57 to prevent the flow of oil over the top of said ring and down the shaft. In order to take care of any small leakage that may occur past said ring 58, the upper face of the thrust collar 36, or the under face of the thrust block, is preferably provided with one or more radially directed channels 59, which at their inner ends communicate with the space wherein the ring 58 is disposed, and at their outer ends with the annular space between the periphery of the thrust block 31 and collar 36 and an air-seal ring 60 of any suitable construction supported in any suitable way on the viscosity pump ring 49. The lower edge 61 of the air-seal ring 60 forms with the opposed surface of the thrust collar a narrow passage 62 which communicates at its inner end with the annular space between the air-seal ring and the periphery of the thrust block and collar, and at its outer end with a suitable number of openings 63 formed in or between the air-seal ring and the viscosity pump ring. When the shaft is not rotating oil will fill the openings 63, the passage 62 and the annular space between the ring 60 and the thrust block 31 and collar 36 up to the level of the oil in the well, but when the shaft is rotating centrifugal force acting on the oil in passage 62 will force all of the oil in the annular space between the ring 60 and the thrust block 31 and collar 36, and part of the oil in the passage 62, out through the openings 63. Therefore the space between the air-seal ring and the thrust block and thrust collar will be kept free of oil, reducing the power loss that would otherwise arise from the churning of the oil in these spaces.

To provide for centralizing the shaft in the event that under some extraordinary condition the shaft should not be held central by the spherical thrust bearing, a ring or bushing 64 is used, being preferably mounted on the base ring 43 and having a running clearance with the shaft. This ring is preferably made of relatively soft metal such as lead bronze or babbitt, so as not to damage the shaft. Said ring will hold the shaft nearly central in the event that for a brief period of time the thrust bearing is not centralizing the shaft.

The entire bearing including the housing is preferably made adjustable laterally so that the desired centralization and adjustment can be initially effected or subsequently obtained. A suitable means for effecting this function is shown in Fig. 3 wherein the deck or spider 44 is provided with a plurality of upstanding lugs 65, eight being used according to the arrangement of Fig. 3. Each of said lugs 65 has threaded therein an adjusting screw 66 which may be retained in adjusted position by lock nuts 67. Each of said screws at its inner end bears upon a pressure distributing block 68 which engages a suitable plane surface 69 formed upon the base ring. Electrical insulation may be interposed between said blocks and the base ring as shown at 70. By adjusting said screws 66 the thrust bearing as a whole may be adjusted in any horizontal direction so as to obtain the desired centering of the shaft.

The thrust bearing as a whole may be adjusted in a vertical direction by the interposition of machined plates 71 between the base ring and the deck, as shown in Fig. 2.

Knowing the thrust load to be carried by the thrust bearing and the lateral forces which may tend to produce lateral displacement of the shaft, such a radius of curvature may be selected for the bearing surfaces of the thrust collar and the stationary bearing member that the thrust bearing will prevent appreciable lateral displacement of the shaft. Thus if the radius of curvature be such that the mean slope of the shoe faces is approximately 30° to the horizontal, any lateral thrust which is less than one-half of the thrust load will not cause the shaft to lift or move sidewise more than permitted by the changes in thickness of the oil films while they are adjusting themselves to set up the pressures required for balancing the applied loads. For example, with a bearing diameter of 47", a thrust load of 435,000 pounds and a speed of 400 R. P. M., it is estimated that a displacement of the shaft of only .001" from center will result from a lateral pressure of 30,000 lbs. if the mean slope is 30° as aforesaid. By increasing the mean slope of the shoe faces to the horizontal, displacement of the shaft under greater lateral pressures can be correspondingly controlled, while if the lateral forces are less the mean slope of the shoes can be correspondingly decreased. Moreover, the center of curvature of the bearing surfaces may be located where the most accurate centering of the shaft is desired, since the least deviation from centralization will occur at this point. For example, the center of curvature may be located at or nearly at the center of a water wheel, and by reason of the close and accurate centralization thereby effected, the running clearances of the water wheel may be reduced.

The spherical thrust bearing for a hydroelectric unit may therefore be disposed closely adjacent to the water wheel, reducing the height of the unit, and as the center of curvature of the bearing surfaces may be disposed at or closely adjacent to the center of the water wheel, the closeness and accuracy with which the shaft can be centralized at this location enables the running clearances of the water wheel to be made relatively small, with a corresponding decrease in the water leakage and a corresponding increase in the efficiency of the unit. In fact, a shaft supported in conformity with the present invention enables a smaller running clearance for the water wheel than is ordinarily possible when the shaft is guided by a steady bearing of the journal type.

Moreover, in motor-driven pumps, a spherical thrust bearing built in conformity with the present invention and located as disclosed in Fig. 1, eliminates the use of an adjacent guide or steady bearing between the motor and the pump. The shaft 14 is of sufficient flexibility in conjunction with the quill 15 so that a flexible coupling is not needed, and therefore the spherical thrust bearing between the motor and the pump may take the place of one steady bearing and two thrust bearings heretofore employed, one of the latter having been above the motor for carrying the load of the rotor thereof. At the same time the location of the thrust bearing beneath the motor permits of the safe application of water-cooling to said thrust bearing, because there is no danger that dripping of leakage from the water-cooling system will reach the windings of the motor and injure the same.

Therefore a bearing in conformity with the present invention may provide a great saving, in that it may eliminate one entire thrust bearing; it enables the thrust bearing used to perform not only its function of a thrust bearing but also of one of the steady bearings heretofore used; and it may also provide for greater efficiency of the unit, enable a reduction in its overall height, and permit the bearing to be safely water-cooled.

In the form shown in Fig. 4, the shaft 75 is suitably connected to a quill 76 which has attached thereto, as by bolts 77, a thrust collar 78 which, in this embodiment, is provided with a convex spherically curved bearing surface 79. A stationary bearing member, again shown as composed of a plurality of tiltably mounted bearing shoes 80, although any other suitable form of bearing member may be used, is provided with a correspondingly concave spherical bearing surface 81. Said shoes 80 are tiltably mounted in any suitable way on a base ring 82, shown as bolted to the wall 83 of the oil well 84. A cooling coil 85 is shown in said oil well, and the base ring is shown as having suitably mounted thereon, as by bolts 86, a baffle 87 which closely surrounds the periphery of the thrust collar. The structure of Fig. 4 is or may be the same as the structure of Fig. 1, except for the inversion of the curvatures of the bearing surfaces so as to dispose the center of curvature thereof above the thrust bearing instead of below the same. It is also to be understood that the curvature of the bearing surfaces in the embodiment of Figs. 2 and 3 may be reversed as in Fig. 4, if desired.

While the bearing surfaces have been shown as spherical in all of the embodiments, the bearing surfaces may be made conical instead of spherical if preferred, but I prefer to use the spherical surfaces because they are easier to produce with the required accuracy, while the conical surfaces are not geometrically ideal since they can fit in only one particular position.

It will therefore be perceived that by the use of the present invention the bearing structure of a vertical hydroelectric unit has been greatly simplified by reduction of the number of bearings to a minimum. At the same time the efficiency of unit may be increased, the running clearances of the water wheel reduced, the overall height of the unit decreased, and water cooling be safely employed for the thrust bearing.

By the present invention the desired centralization of the shaft can also be obtained at the desired point in the length of the shaft, and this point can be located at or adjacent the water wheel, so as to effect a reduction in clearances not safely obtainable with the journal bearings heretofore used.

Also an improved spherical thrust bearing has been provided which, while particularly useful in a hydroelectric unit, is susceptible of use in other installations. By the present invention all danger of the thrust block or thrust collar working loose and permitting the shaft to become off center has been eliminated, while improved means for effecting a circulation of the oil, preventing leakage of oil along the shaft, decreasing the power loss, adjusting the centering of the shaft, and maintaining the centering of the shaft in the remote contingency that the thrust bearing is not seated, have been provided.

While the embodiments of the invention illustrated on the drawings have been described with considerable particularity, it is to be expressly understood that the invention is not restricted thereto, as the invention is capable of receiving a variety of mechanical expressions, some of which will now readily suggest themselves to those skilled in the art, while changes may be made in the sizes, proportions and details of construction of the parts, and certain features used without other features, without departing from the spirit of this invention. Reference is therefore to be had to the claims hereto appended for a definition of the limits of the invention, wherein the term "water wheel" will be used as generic to either the rotary element of a pump or turbine, the term "rotor" will be used as generic to the rotary element of either a motor or generator, and the term "hydroelectric unit" will be used as generic to either a water wheel driven rotor or rotor-driven water wheel.

What is claimed is:

1. In a hydroelectric unit, in combination with a water wheel, a rotor and a shaft connected to said rotor, a thrust bearing interposed between said rotor and said water wheel, said thrust bearing having spherically curved bearing surfaces of such radius of curvature that said shaft is rigidly centralized against the lateral forces tending to displace said shaft.

2. In a hydroelectric unit, in combination with a water wheel, a rotor and a shaft connected to said rotor, a thrust bearing interposed between said rotor and said water wheel, said thrust bearing having spherically curved thrust surfaces with their center of curvature adjacent said water wheel.

3. In a hydroelectric unit, in combination with a water wheel, a rotor and a shaft connected to said rotor, a thrust bearing interposed between said rotor and said water wheel, said thrust bearing having curved bearing surfaces inclined to the axis of said shaft at such an angle as to rigidly centralize said shaft against the lateral forces tending to displace said shaft.

4. In a vertical hydroelectric unit, in combination with a water wheel, a rotor disposed above said water wheel and a shaft connected to said rotor, a single thrust bearing for both said rotor and said water wheel, said thrust bearing being disposed between said rotor and said water wheel and provided with spherically curved bearing surfaces.

5. In a vertical hydroelectric unit, in combination with a water wheel, a rotor disposed above said water wheel and a shaft connected to said rotor, a single thrust bearing for both said rotor and said water wheel and interposed between the same, said thrust bearing including cooperating thrust members whose bearing surfaces are inclined to the axis of the shaft at such an angle as to rigidly centralize said shaft.

6. In a hydroelectric unit, in combination with a water wheel, a rotor and a shaft connected to said rotor, a thrust bearing interposed between said rotor and said water wheel, said thrust bearing including a thrust collar and a plurality of bearing shoes provided with mating curved bearing surfaces inclined to the axis of said shaft so as to rigidly centralize said shaft.

7. In a hydroelectric unit, in combination with a water wheel, a rotor and a shaft connected to said rotor, a thrust bearing interposed between said rotor and said water wheel, said thrust bearing including a thrust collar and a plurality of tiltably mounted bearing shoes having mating curved surfaces inclined to the axis of said shaft so as to rigidly centralize said shaft.

8. In a vertical motor-driven pump, in combination with a pump, an electrical motor disposed above said pump and a pump shaft driven by said motor, a single thrust bearing common to and interposed between said motor and said pump, said thrust bearing including a thrust collar and a stationary bearing member cooperating therewith and having spherically curved bearing surfaces.

9. In a vertical motor-driven pump, in combination with a pump, an electrical motor disposed above said pump and a pump shaft driven by said motor, a thrust bearing common to and interposed between said motor and said pump, said thrust bearing including a thrust collar and a plurality of bearing shoes cooperating therewith and having cooperating curved bearing surfaces.

10. In a vertical hydroelectric unit, in combination with a water wheel, a rotor disposed above said water wheel and a shaft connected to said rotor, a thrust bearing interposed between said rotor and said water wheel, said thrust bearing having spherically curved bearing surfaces whose center of curvature is substantially at the center of said water wheel.

11. In a vertical hydroelectric unit, in combination with a water wheel, a rotor disposed above said water wheel and a shaft connected to said rotor, a thrust bearing interposed between said rotor and said water wheel, said thrust bearing including a thrust collar and a plurality of tiltably mounted bearing shoes having spherically curved bearing surfaces whose center of curvature is substantially at said water wheel and whose radius of curvature is such as to rigidly centralize said shaft.

12. In a thrust bearing, a shaft, a thrust block carried thereby and having a conical surface, a thrust collar carried by said block and having a mating conical surface, said thrust collar having a spherically curved bearing surface, and a stationary thrust member having a mating spherically curved bearing surface.

13. In a thrust bearing, a shaft, a thrust block carried thereby and having a conical surface, a thrust collar carried by said block and having a mating conical surface, said thrust collar having a curved bearing surface inclined to the axis of said shaft and a stationary bearing member having a bearing surface mating therewith.

14. In a thrust bearing, a shaft, a thrust block carried thereby and having a conical surface, a thrust collar carried by said block and having a mating conical surface, said thrust collar having a spherically curved bearing surface, said conical surfaces being at right angles to the mean radius of said spherical surface, and a stationary bearing member having a spherically curved bearing surface mating with the bearing surface of said collar.

15. In a thrust bearing, a shaft, a thrust block carried thereby and having a conical surface, a thrust collar carried by said block and having a mating conical surface, said thrust collar having a curved bearing surface inclined to the axis of the shaft and said conical surfaces being perpendicular to the mean perpendicular to said bearing surface, and a stationary bearing member having a curved bearing surface mating with the bearing surface of said collar.

16. In a thrust bearing, a shaft, a thrust block carried thereby and having a conical surface, a thrust collar carried by said block and having a mating conical surface, said thrust collar having a curved bearing surface inclined to the axis of said shaft and a stationary bearing member composed of a plurality of tiltable bearing shoes having curved surfaces mating with the surface of said collar.

17. In a thrust bearing, a shaft, a thrust block on said shaft having a curved surface inclined to the axis of said shaft, a thrust collar mounted on said block and having a surface mating with the surface of said block, said collar having a curved bearing surface inclined to the axis of said shaft, and a stationary bearing member having a curved bearing surface mating therewith.

18. In a thrust bearing, a shaft, a thrust block on said shaft having a curved surface inclined to the axis of said shaft, a thrust collar mounted on said block and having a surface mating with the surface of said block, said thrust collar having a spherically curved bearing surface, and a stationary bearing member having a spherically curved bearing surface mating therewith.

19. In a thrust bearing, the combination of a shaft, a thrust collar carried thereby and having a curved bearing surface inclined to the axis of said shaft, a stationary bearing member having a mating curved bearing surface cooperating therewith, a base ring on which said stationary bearing member is mounted, a support on which said base ring is mounted, and means for adjusting said base ring horizontally with respect to said support including adjusting screws and pressure distributing blocks between said screws and said base ring.

20. In a thrust bearing, the combination of a shaft, a thrust collar carried thereby and having a curved bearing surface inclined to the axis of said shaft, a stationary bearing member having a mating curved bearing surface cooperating therewith, a base ring on which said stationary bearing member is mounted, and a bushing extending from said base ring into sufficient proximity to said shaft to centralize said shaft in the event said shaft is not centralized by said mating curved surfaces.

21. In a vertical thrust bearing, the combination with a shaft, a rotary bearing member carried thereby and having a curved bearing surface inclined to the axis of said shaft, a stationary bearing member having a mating curved bearing surface, and a viscosity pump ring cooperating with the periphery of said rotary bearing member.

22. In a thrust bearing, the combination with a shaft, a rotary bearing member carried thereby and having a curved bearing surface inclined to the axis of said shaft, a stationary bearing member having a mating curved bearing surface, and an air-seal ring cooperating with the periphery of said rotary bearing member and providing therewith a radially narrow space which is maintained free of oil when the bearing is in operation.

23. In a vertical thrust bearing, the combination with a shaft, a rotary bearing member carried thereby and having a curved bearing surface inclined to the axis of said shaft, a stationary bearing member having a mating curved bearing surface, a viscosity pump ring cooperating with the periphery of said rotary bearing member, an oil well in which said bearing members are immersed, and an oil cooler communicating with said pump ring and said oil well.

24. In a vertical thrust bearing, the combination with a shaft, a rotary bearing member carried thereby and having a curved bearing surface inclined to the axis of said shaft, a stationary bearing member having a mating curved bearing surface, a viscosity pump ring cooperating with the periphery of said rotary bearing member, an oil well in which said bearing members are immersed, and an oil cooler communicating with said pump ring and said oil well and disposed below the level of the oil in said well.

25. In a thrust bearing, the combination with a shaft, a rotary bearing member carried thereby and having a curved bearing surface inclined to the axis of said shaft, a stationary bearing member having a mating curved bearing surface, a base ring on which said stationary bearing member is mounted, an oil retaining ring carried by said base ring, and an oil-seal ring carried by said rotary bearing member and cooperating with said oil retaining ring.

26. In a thrust bearing, the combination with a shaft, a rotary bearing member carried thereby and having a curved bearing surface inclined to the axis of said shaft, a stationary bearing member having a mating curved bearing surface, a base ring on which said stationary bearing member is mounted, an oil retaining ring carried by said base ring, and means for returning oil which approaches the top of said ring, said means including one or more passages in said rotary bearing member through which the oil is returned by centrifugal force.

27. In a thrust bearing, the combination with a shaft, a rotary bearing member carried thereby and having a curved bearing surface inclined to the axis of said shaft, a stationary bearing member having a mating curved bearing surface, and an air-seal ring cooperating with the periphery of said rotary bearing member and forming a passage therewith from which the oil is thrown by centrifugal force while said shaft is rotating.

28. In a thrust bearing, the combination with a shaft, a rotary bearing member carried thereby and having a curved bearing surface inclined to the axis of said shaft, a stationary bearing member having a mating curved bearing surface, an air-seal ring cooperating with the periphery of said rotary bearing member and forming a passage therewith from which the oil is thrown by centrifugal force, and one or more passages in said rotary bearing member communicating with said first-named passage and with the space at the inner periphery of said rotary bearing member.

29. In a thrust bearing, a shaft, a rotary bearing member carried thereby, a stationary bearing member cooperating therewith, and an air-seal ring cooperating with the periphery of said rotary bearing member and forming a passage therewith from which the oil is thrown by centrifugal force.

30. In a thrust bearing, a shaft, a rotary bearing member carried thereby, a stationary bearing member cooperating therewith, and an air-seal ring cooperating with the periphery of said rotary bearing member and forming a passage therewith from which the oil is thrown by centrifugal force, said rotary bearing member having one or more passages communicating with said first-named passage and with the space at the inner periphery of said rotary bearing member.

31. In a thrust bearing, the combination of a shaft, a rotary bearing member carried thereby and having a curved bearing surface inclined to the axis of said shaft, a stationary bearing member having a mating curved bearing surface, a base ring on which said stationary bearing member is mounted, and means cooperating with a rotatable element of said bearing to centralize said shaft in the event said shaft is not centralized by said curved bearing surfaces.

32. In a thrust bearing, in combination with a shaft, a rotary bearing member carried thereby and having a spherically curved bearing surface, a stationary bearing member having a spherically curved bearing surface cooperating with the bearing surface of said rotary member, a base ring on which said stationary bearing member is mounted, and means surrounding and having a shaft clearance with a rotatable element of said bearing for centralizing said shaft in the event said bearing surfaces are not in contact.

33. In a thrust bearing, in combination with a shaft, a thrust block carried thereby and having a conical inner surface, a thrust collar carried by said thrust block and having a cooperating conical surface whereby said thrust collar may expand without moving off center, and a stationary bearing member cooperating with said thrust collar.

34. In a thrust bearing, a shaft, a thrust block on said shaft having a curved surface inclined to the axis of said shaft, a thrust collar mounted on said block and having a surface mating with the surface of said block, said collar having a curved bearing surface inclined to the axis of said shaft, and a plurality of tiltably mounted bearing shoes having curved surfaces mating with the bearing surface of said collar.

35. In a thrust bearing, a shaft, a thrust block on said shaft having a curved surface inclined to the axis of said shaft, a thrust collar mounted on said block and having a surface mating with the surface of said block, said collar having a spherically curved bearing surface, and a plurality of tiltably mounted bearing shoes having spherically curved bearing surfaces cooperating with said collar.

36. In a vertical motor driven pump, in combination with a pump, an electrical motor disposed above said pump, and a pump shaft driven by said motor, a thrust bearing common to and interposed between said motor and said pump, said thrust bearing including a thrust collar having a curved bearing surface inclined to the axis of the pump shaft and a cooperating bearing member having a mating curved bearing surface.

37. In a vertical hydro-electric unit, in combination with a water wheel, a rotor disposed above said water wheel and a shaft connected to said rotor, a thrust bearing interposed between said rotor and said water wheel, said thrust bearing having spherically curved bearing surfaces whose center of curvature is substantially at said water wheel and whose radius of curvature is such as to rigidly centralize said shaft.

38. In a thrust bearing, a shaft, a rotary bearing member carried thereby, a stationary bearing member cooperating therewith, and an air-seal ring cooperating with the periphery of said rotary bearing member and forming a radially narrow passage therewith, said passage having outlets whereby said passage is maintained free of oil by reason of the centrifugal action of the rotary bearing member when the bearing is in operation.

39. In a thrust bearing, a shaft, a rotary bearing member carried thereby, a stationary bearing member cooperating therewith, a base ring on which said stationary bearing member is mounted, an oil retaining ring carried by said base ring, and an oil-seal ring carried by said rotary bearing member at its inner periphery and cooperating with said oil retaining ring.

40. In a thrust bearing, a shaft, a rotary bearing member carried thereby, a stationary bearing member cooperating therewith, a base ring on which said stationary bearing member is mounted, an oil retaining ring carried by said base ring, and an oil-seal ring carried by said rotary bearing member at its inner periphery and cooperating with said oil retaining ring, said rotary bearing member being provided with passages above said oil retaining ring whereby any oil which passes said retaining ring is returned through said passages by centrifugal action.

41. In a thrust bearing, in combination with a shaft, a thrust block integral therewith and having a concave conical surface, a thrust collar carried by said thrust block and having a cooperating convex conical surface whereby said thrust collar may expand without moving off center, and a stationary bearing member cooperating with said thrust collar.

42. In a thrust bearing, in combination with a shaft, a thrust block integral therewith and having a concave conical surface, a thrust collar carried by said thrust block and having a cooperating convex conical surface whereby said thrust collar may expand without moving off center, said thrust collar having a spherical bearing surface, and a stationary bearing member having a mating spherical surface cooperating with said thrust collar.

In testimony whereof I have signed this specification.

ALBERT KINGSBURY.